Patented Jan. 22, 1946

2,393,273

UNITED STATES PATENT OFFICE 2,393,273

TREATMENT OF MUD-LADEN DRILLING FLUIDS

Truman B. Wayne, Houston, Tex.

No Drawing. Application March 31, 1939, Serial No. 265,149

10 Claims. (Cl. 252—8.5)

This invention relates generally to the treatment of mud-laden drilling fluids, and particularly to the treatment of such fluids as are employed in the rotary drilling of oil and gas wells so as to improve the physical properties of said fluids.

The fluid employed for rotary drilling operations contains a gel-forming component and may be made from the natural clay which occurs at the location or may be synthetically compounded from the clay and mud bases of commerce, including bentonite and beidellite. Such fluids may also contain a heavy substance such as barytes, iron oxide, or the like, for increasing the specific gravity of the fluid.

Such fluids as are synthetically compounded may be controlled as to viscosity by a proper variation of the colloidal content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult.

It is an object of the present invention, generally stated, to provide a process and agent for the treatment of mud-laden drilling fluids in order to control the viscosity and thixotropic properties thereof.

Another object of the invention is to provide a process and agent for treating such fluids whereby the properties of the hydrated clay colloids are modified and the viscosity of the fluid reduced.

A further object of the invention is to provide a mud-laden drilling fluid and the process of making it in which the properties of the colloidal matter in the fluid are substantially modified and rendered suitable for rotary drilling purposes.

A more specific object of this invention is to provide a process and agent for the treatment of mud-laden drilling fluids from a class of chemical reagents, and a treatment wherein a member of said class of chemical reagents is used, and a drilling fluid which has been suitably modified by said treatment, as will hereinafter be described.

Other objects will become apparent to those skilled in the art when the following description is read.

In accordance with the illustrative embodiments of this invention, generally stated, a mud-laden fluid such as that employed in the rotary drilling of oil wells may be treated with a chemical agent which, upon reaction with certain constituents of the fluid, modifies the colloidal properties of the colloidal matter in the fluid. More specifically, in accordance with the present invention, a degelling action on the mud-laden or drilling fluid is produced by a class of chemical substances which may be generally described as "organic tanning bodies." This may be accomplished by treatment with chemicals so selected and under such conditions that the organic tanning body combines chemically, or forms an adsorption product, with the gelatinous colloidal fraction of the mud-laden or drilling fluid and produces a chemical and/or physical change in the nature of these colloids. This change may be attributed to (1) penetration of the interstices between the various micelle fibers of the gelatinous colloid and depriving them of water; (2) chemical changes in the nature of the gel fibers which change the hydration capacity or degree of hydration of the hydrated colloids; and (3) mechanical coating and insulating the gel fibers from each other through adsorption on the face of the gel colloids of the reaction products of the organic tanning body and certain constituents of the mud-laden or drilling fluid. The exact action of these agents is not entirely understood and may be due to one or more of the three effects above enumerated.

In accordance with the illustrative embodiments of this invention, the drilling fluid, or mud, which is an aqueous mud-laden fluid and contains a gel-forming component, is maintained at a pH range below 8.0 and generally at a pH from 2.4 to 8.0. At such a range it is subjected to the action of a tanning agent or tanning body and more particularly an organic tanning agent or body. The pH range below 8.0 is in the range within which insoluble combinations between the gel-forming components and the organic tanning agent or body can best occur. In accordance with the illustrative embodiments of this invention a drilling fluid maintained at such a pH range is treated with an acidic body agent, such as a sugar acid and an organic tanning agent or body within such pH range.

No single theory completely explains the dehydration of the gelatinous colloids of either leather or drilling fluids. One or more of the mechanisms described in the preceding paragraph probably explains the action of a tanning agent on leather, so the analogy drawn herein between leather tanning and the degelling of muds is new in the latter art. In either case it involves the transformation of hydrophilic substances (gels)

into hydrophobic substances to varying degrees, depending on the completeness of the result desired. Reactions and/or adsorptions are involved in the production of the desired effects in either art. Presumably, such reactions may comprise either primary or secondary valence reactions, or both, between the gel colloid and the organic tanning body. The effect of the organic tanning body under such conditions is not simply that of a peptizing body. More than mere dispersion of the particles is involved.

I am aware that the Lawton et al. Patent No. 1,999,766 dated April 30, 1935, discloses the use of tannins of vegetable origin as suitable members of a large class of substances which they term "an organic material of feebly acidic properties" to be used in conjunction with a caustic alkali such as caustic soda or sodium carbonate in the preparation of agents for the treating of mud-laden or rotary drilling fluids. However, in this Lawton et al. patent, the object is to deflocculate the clay particles by means of a caustic alkali in the presence of a protective organic colloid such as tannins, lignins, humins, and the like. The function of the organic matter, including the tannin, in this patent is simply that of a protective colloid, and its action is best explained by reference to a publication by Neubert (J. K. Neubert, Kolloid-chem. Beihefte Vo. 4, (1912) page 261) which explains the mechanism as follows:

"On the addition of an alkaline solution (of suitable concentration) to clay, the clay particles adsorb the hydroxyl ions and repel each other. The mass becomes fluid as a result of the increased mobility of the clay particles. After a time, stiffening, occasioned by the swelling of the clay particles, sets in. The humus substances contained in the clay also swell and are thereby empowered to form alkali humate. But only a very small amount of alkali can be removed from the adsorption equilibrium in this way, since the alkali humate formed is extensively hydrolyzed and again furnishes hydroxyl ions. As the alkali addition increases, its suspending effect becomes so marked that the stiffening resulting from swelling becomes continually less perceptible. Liquefaction is also facilitated by splitting up of the clay particles which results from the solution of humus by the alkali. At the point of maximum liquefaction the two effects, swelling and splitting up of the clay particles, determine the equilibrium. But the splitting effect is not yet marked; it first appears prominently in the reliquefaction. If a sufficiently high concentration of alkali is now used, the hydroxyl ions force the alkali humate, which has a protective effect, from the adsorbing surface. This should again lead to stiffening of the slip. But the high concentration of alkali provides the possibility of an increasingly extensive splitting of the clay particles. New adsorbing surfaces come into play, and the amount of alkali humate is increased. The clay is again gradually converted into the fluid condition. It is reliquefied. With further increase in alkali concentration, the reliquefaction gradually becomes less, since (1) the increase in the amount of alkali humate is limited by the humus content of the clay; (2) less alkali humate remains adsorbed with increasing hydroxyl ion concentration; and (3) the decrease in the amount of alkali humate at higher hydroxyl-ion concentrations as the result of the appearance of fresh surfaces will not necessitate a corresponding decrease in the amount of adsorbed hydroxyl ions. The clay slip will then remain stiff."

The disclosure of Lawton et al. in the specification, as well as in the claims, specifies that caustic alkali in the proportion of three parts shall be present for each one part of tannic acid by weight. Considering the relative molecular weights of the caustic alkalies and the bodies which yield tannic acid, it is obvious that Lawton et al.'s reagent always contains a large excess of free caustic soda, and, in fact, it is also evident that the action of Lawton et al.'s reagent is based on the deflocculating effect of the hydroxyl ions present in their reagent and that the function of organic matter is to form an organic salt of the caustic alkali which acts as a buffering agent to control the availability of the hydroxyl ions in the mud-laden or drilling fluid.

In the tanning of leather by the use of tannic acids and bodies which yield tannic acid, a tanning action is not obtained in an alkaline medium. Normal tannage can apparently take place only when both the liquors and the skin are on the acid side of the isoelectric point of collagen, namely, pH 4.7, though it has been shown that gelatin solutions are precipitated by tannin up to a pH of about 8, which is decidedly alkaline. In alkaline liquors tannage does not take place. (See "The Theory and Application of Colloidal Behavior," R. H. Bogue, McGraw-Hill Publishing Company, New York, volume 2, chapter XXX, 1924.) This type of combination between collagen and tannin below its isoelectric point is probably due to electrovalent linkage, i. e., involving the transfer of electrons as distinct from sharing them. Above its isoelectric point covalent linkages between collagen and the organic tannin body are probably involved.

The present invention is based on the discovery that the gelatinous colloidal fractions present in clays, bentonites, beidellites, and similar substances used in the preparation of mud-laden or drilling fluids are negatively charged bodies resembling to a marked extent the properties of gelatine when the latter is on the alkaline side of its isoelectric point. These natural colloidal fractions of clays, etc., have the property of swelling in water and can absorb several times their own weight of water from aqueous suspensions. This swelling is promoted by either an alkaline or an acid medium, much in the same manner that the gelatine-yielding collagen swells in hides during the soaking operations preceding the tanning process. Gelatine possesses this same property and behaves very much in the same manner towards tannins as do the natural colloidal fractions obtained from clays and similar substances. For instance, the viscosity of a highly viscous gelatinous suspension of bentonite, or other concentrated colloidal clayey material, in water may be markedly reduced by treating it with an acid solution of an organic tanning body. The swollen gel is apparently dehydrated due to certain chemical or physical combinations between the organic tanning body and the colloidal gel particles. If enough acidic organic tanning body is used, the gel can be completely precipitated and destroyed, and the solution will lose its high viscosity. The insoluble organic tanning body gel complex so formed has a very low hydration capacity and, therefore, does not exist as a gelatinous colloid. This action should not be confused with the action of tannin in alkaline media where it functions merely as a peptizing substance.

The colloidal fractions of bentonite, as well as those of various clays obtained from widely different locations, are quite similar in their composition with respect to silica, alumina, and iron, the main deviation only being from 10 to 15 per cent of the average of each of these substances. The differences in properties exhibited by mud-laden or drilling fluids prepared from clays and clayey materials obtained from various sources are largely due to varying proportions of calcium and/or magnesium present in the colloidal fraction and to the larger proportion of non-colloidal inert material contained in the same clayey suspension. In all cases these gel substances are complex hydrous silicates containing considerable proportions of aluminum and, in fact, may be classed either as hydrous alumino-silicates or in some instances hydrous silico-aluminates. Such substances invariably contain appreciable quantities of calcium and/or magnesium in their composition and it has been observed that the corresponding sodium or potassium compound does not possess the same degree of gelatinous properties and the accompanying high viscosity that is associated with the corresponding alkaline-earth bearing hydrous silicates.

Various aluminum-containing compounds exhibit amphoteric properties; that is, they may be either acid or basic, depending on the acidity or basicity of the substances in which they are brought in contact. An amphoteric substance may react as a base with substances more acid than itself and may react as an acid with substances more basic than itself. In addition, complex compounds of aluminum, silicon, and similar metallic substances having more than one valence can often undergo reactions due to secondary valences, and it is quite possible that reactions which the colloidal fraction of clayey materials undergo with tannins may be due to such secondary valences. In any event, combination between the substances occurs with the production of a reaction or adsorption product which possesses little or no hydration properties in contradistinction to the marked hydration and swelling properties of the original colloid. It is, therefore, obvious that the use of an agent which will undergo such reactions with the colloidal fraction of clayey suspensions is of value in the degelling and controlling of the viscosity of mud-laden or rotary drilling fluids. The use of an organic tanning body in the above described manner is clearly distinguished from the use of an organic tanning body as a protective colloid in the presence of a large excess of an alkaline deflocculating agent, in an alkaline medium. As has been previously pointed out, reactions akin to the action of tannins on the collagen of leather do not occur in a highly alkaline medium and an analogy has herein been drawn between the action of tannins in the tanning operation and in the degelling of mud-laden or rotary drilling fluids.

Various natural organic tanning agents such as extracts from quebracho, chestnut, cutch, mangrove, hemlock, divi-divi, mimosa, oakbark, sumac, and various other natural tannins, including derivatives of such organic tanning bodies as pyrogallol, phloroglucinol, protocatechuic acid, hydroquinone, and similar substances, are examples of organic tanning bodies suitable for my purpose. Synthetic organic tanning bodies prepared usually from phenolic bodies and aldehydes, or from aromatic sulfonic acids and aldehydes, which comprise the well known class of synthetic tanning agents known as "syntans" which are used in the tanning of leather in a manner somewhat analogous to the use of natural tannins, are also suitable. The action of these various tanning agents is that of forming insoluble combinations with the gelatine present in the collagen of leather, and likewise the formation of dehydrated precipitates with the gelatinous colloidal fraction of clayey mud-laden or rotary drilling fluids.

In general, the process comprises the addition of an acidic solution of an organic tanning body to the mud-laden or rotary drilling fluid in any convenient manner. Since most of the natural vegetable tannins are acidic in character, it is not always necessary to add an auxiliary acidifying substance in order to reduce the pH of the mud within the range where the maximum degelling effect occurs. For instance, if large quantities amounting to from 0.5 to 2 per cent of the organic tanning body based on the weight of the entire drilling fluid are added, it is often unnecessary to add an acidifying body in order to produce the desired effect. However, with smaller quantities of the organic tanning body, namely, from 0.02 to 0.20 per cent of the organic tanning body on the weight of the drilling fluid, it is desirable to add either simultaneously with the organic tanning body or by a pre-treatment of the mud-laden or drilling fluid, a weakly ionized acidic substance which will reduce the pH of the mud within the range of pH 2.4 to pH 8.0, which is the range within which these insoluble combinations between the colloidal fraction of the mud and the organic tanning body can best occur. Above the pH of 8.0, the organic tanning body merely acts as a protective colloid in the manner hereinbefore described, and which is disclosed in the Lawton et al. Patent 1,999,766. Its effect at higher alkalinities is not comparable to the effect within the pH range stated, and the results are not substantially permanent due to the fact that no insoluble combinations occur which reduce the hydration capacity of the clay colloids. Flocculation and deflocculation of clays in the presence of alkalies and a protective colloid are reversible phenomena.

As suitable organic acidifying substances may be mentioned weak organic acids such as acetic, lactic, propionic, butyric, gluconic, levulinic, mucic, malic, maleic, tartaric, and other similar acids. Acid salts of dibasic acids are likewise suitable; for instance, acid phthalates, maleates, tartrates, and the like. Among suitable inorganic acidifying substances are weak acids such as boric, phosphoric, and their acid salts.

Ordinarily, it is difficult to mix these acidic substances with the organic tanning body for the reason that coagulation of the organic tanning body occurs. For best results it is, therefore, best to add the weakly acidic material to the drilling mud and then follow this treatment with a solution of the organic tanning body. With mud-laden or rotary drilling fluids having an initial pH below 8.0, it is often unnecessary to add the acidifying substance, as the organic tanning body itself possesses enough acidic properties to produce the desired result.

Another suitable procedure in making a composition for the control of the viscosity of mud-laden drilling fluids, is to prepare a dilute solution of an organic tanning body and allow the sugars and similar substances within the solution to ferment very much in the manner that is employed in the tanning of hides. This solution is then added directly to the mud-laden or rotary drilling fluid.

In order to illustrate the principles of my invention, a number of specific examples are hereinafter given. However, it should be distinctly understood that I do not confine myself to the specific treating agents, drilling fluid compositions or proportions hereinafter disclosed, as it should be understood by those skilled in the art that variations from these disclosures do not depart from the principles and spirit of my invention which is directed in a general way to the use of tannin bodies in the degelling and controlling of the viscosity of mud-laden or rotary drilling fluids.

As will be noted from the following specific examples, the present invention is clearly distinguished from the prior art by the fact that the organic tanning bodies, or stated more generally, the tanning agents, are used in an acidified medium in direct contradistinction to the use of alkalies as deflocculating agents in the presence of tannins in an alkaline medium as a peptizing and protective agent.

The effect of acidification on the degelling efficiency of various organic tanning bodies is illustrated in the following examples. As will be apparent from a study of these examples, there is usually a small initial reduction of the viscosity of alkaline drilling fluids after treating them with the various acids, but many of these acids do not continue to produce viscosity reductions as proportionate increases in their concentrations are made. However, certain acids do produce degelling effects to varying extents, and I do not mean to exclude them from the class of acid bodies suitable for increasing the degelling effect of the organic tanning bodies. Obviously, other considerations such as cost, availability, and ease of handling being equal, one would select an acid which may contribute somewhat to the degelling effect in addition to that contributed by the organic tanning body, aside from its activating effect on the latter.

The following examples exemplify the use of my improving degelling agents on a normal mud-laden drilling fluid prepared in the usual manner from natural or synthetic mud-making materials. The relatively small proportions disclosed are normally sufficient to obtain a satisfactory treatment. However, if it is desired to add larger quantities of gel-forming materials such as bentonite, it is also necessary to use larger proportions of the treating agent, usually from 0.5 to 2.5 per cent, or even higher, based on the weight of the drilling fluid. The excess of treating agent reduces the gel-forming properties of the excess bentonite or other material added, and thus allows larger proportions of gel-forming material to water than normally can be incorporated in the drilling fluid. For instance, wherein a normal 8 per cent suspension of bentonite in water may have a viscosity of 48 centipoises in the Stormer viscosimeter at 600 R. P. M., if the drilling fluid contains as much as 2 per cent of the treating agent, very much larger quantities of bentonite may be incorporated without unduly increasing the viscosity. In fact, fluid muds may thus be prepared from bentonite which approximate the solids composition of muds prepared from natural sources.

It is likewise obvious that muds which have become contaminated with cement, calcareous shales, and/or other sources of polyvalent metal compounds which have produced abnormal viscosities, will require heavier treatments with my improved treating agent to produce normal viscosities for muds so contaminated.

The tests described in the following examples were conducted on well drilling fluids prepared largely from Wyoming bentonites and water so as to have a maximum content of the hydrous aluminum silicates which are reacted upon by acidic tannin bodies in the manner herein described. Drilling fluids prepared from natural clays and shales usually encountered during drilling operations are similarly acted upon, since in all cases the colloidal fractions of such materials are quite similar in composition and properties to the purer colloidal gel-forming material, bentonite.

EXAMPLE 1

A drilling fluid, prepared from Wyoming bentonite, having an initial viscosity of 38 centipoises and a pH of 9.4 was first treated with a freshly prepared tetraphosphoric acid solution in the proportion of 1 part of the acid per 1000 parts of drilling fluid. It was then treated with a solution of quebracho extract in various proportions. The results are tabulated in Table I in comparison with similar additions of the organic tanning body without the addition of acid.

Table I

| Ratio of quebracho to drilling fluid | Original drilling fluid— no $H_6P_4O_{13}$ | Drilling fluid plus 1/1000 of $H_6P_4O_{13}$ |
|---|---|---|
| | Cp. | Cp. |
| None | 38 | 31 |
| 1/1000 | 34 | 23 |
| 1/500 | 30 | 19 |
| 1/250 | 28 | 15 |

EXAMPLE 2

A drilling fluid having a viscosity of 47 centipoises and a pH of 9.4 was treated with d-gluconic acid in the proportion of 1 part of acid to 500 parts of drilling fluid. It was then treated with a solution of quebracho extract in various proportions. The results are tabulated in Table II.

Table II

| Ratio of quebracho to drilling fluid | Original drilling fluid— no gluconic acid | Drilling fluid plus 1/500 of gluconic acid |
|---|---|---|
| | Cp. | Cp. |
| None | 47 | 33 |
| 1/1000 | 38 | 25 |
| 1/500 | 33 | 21 |
| 1/250 | 31 | 18 |

Table II can be compared with the following table in which an acidic body, and more particularly a sugar acid such as d-gluconic acid is employed as a treating agent; the results are shown in Table III.

Table III

| Ratio of 50% d-gluconic acid solution to drilling fluid | Viscosity in centipoises |
|---|---|
| Original drilling fluid no treatment | 47 |
| 1:1000 | 39 |
| 1:500 | 33 |
| 1:250 | 29 |

This comparison is more clearly comparative from the following table which is a composite of Tables II and III and in which the readings marked with a * are obtained by interpolation and in which the readings marked by ** are obtained by extrapolation.

Table IV

| Ratio of agent to drilling fluid | Viscosity readings in centipoises | | | |
|---|---|---|---|---|
| | (1) Sugar acid | (2) Tannin | (3) Sugar acid + tannin | (4) Details of column (3) |
| Original fluid no treatment viz. no agents | 47 | 47 | 47 | |
| 1/1000 | 39 | 38 | | |
| 1/750 | 36.5* | 35.5* | 25 | {1/1000 tannin / 1/500 sugar acid} =1/750 |
| 1/500 | 33 | 33 | 23* | =1/500 |
| 1/375 | 31.5* | 32* | 22* | =1/375 |
| 1/250 | 29 | 31 | 21 | {1/500 tannin / 1/500 sugar acid} =1/250 |
| 1/187.5 | 27** | 30** | 18 | {1/250 tannin / 1/500 sugar acid} =1/187.5 |

From the above, it will be seen that the combination of the acidic body and of the tanning body is several times as effective as is either of the components when used alone. This will readily be apparent from the 1/250, where the reduction in viscosity by the combination is much more than by either of the components at the same ratio. As a matter of fact, a comparison of the 1/750 ratio with the 1/187.5 ratio shows that it requires as much (1/750) of the combination to reduce the drilling fluid to a viscosity of 25, as it does with either of the components (1/187.5) to reduce the viscosity to 27 or 30. That is of importance in this art because of the great saving in the required amount of the combination needed. Here the efficiency of the combination is four times that of either of the components.

EXAMPLE 3

A drilling fluid having a viscosity of 51 centipoises and a pH of 9.4 was treated with tartaric acid in the proportion of 1 part of acid to 500 parts of drilling fluid. It was then treated with a solution of chestnut extract in various proportions. The results are tabulated in Table III.

Table V

| Ratio of chestnut to drilling fluid | Original drilling fluid—no tartaric acid | Drilling fluid plus 1/500 tartaric acid |
|---|---|---|
| | Cp. | Cp. |
| None | 51 | 46 |
| 1/1000 | 44 | 39 |
| 1/500 | 39 | 35 |
| 1/250 | 35 | 31 |

EXAMPLE 4

Another sample of the same drilling fluid described in Example 3 was treated with a solution of ortho-phosphoric acid in the proportion of 1 part of acid to 1000 parts of drilling fluid. It was then treated with a solution of chestnut extract in various proportions. The results are tabulated in Table IV.

Table VI

| Ratio of chestnut to drilling fluid | Original drilling fluid—no $H_3PO_4$ | Drilling fluid plus 1/1000 $H_3PO_4$ |
|---|---|---|
| | Cp. | Cp. |
| None | 51 | 43 |
| 1/1000 | 44 | 35 |
| 1/500 | 39 | 29 |
| 1/250 | 35 | 24 |

EXAMPLE 5

The acidic body used in connection with the organic tanning body need not be a free acid. It may be an acid salt or other acidic body, or a buffer salt which will maintain the pH below 8.0. In fact, buffer salts may be preferred in many cases as they obviate the care necessary in adding an acid to prevent undue flocculation. If the acidity were increased to the point where substantial flocculation, and/or the pH is decreased below the isoelectric point of the drilling fluid, the efficiency of the treatment is destroyed. As a specific example of the foregoing, a drilling fluid having a viscosity of 51 centipoises and a pH of 9.4, which is above the point for satisfactory results with organic tanning bodies according to the principles herein disclosed, was treated with sodium boroformate, an acid salt having a pH of 6.0, in the proportion of 1 part of the salt to 250 parts of drilling fluid. The fluid containing the acidic buffer salt was then treated with chestnut extract in the proportions shown in Table V.

Table VII

| Ratio of chestnut to drilling fluid | Original drilling fluid—no Na boroformate | Drilling fluid plus 1/250 Na boroformate |
|---|---|---|
| | Cp. | Cp. |
| None | 51 | 43 |
| 1/1000 | 44 | 28 |
| 1/500 | 39 | 22 |
| 1/250 | 35 | 21 |

Examination of the data in the preceding examples makes it clear that best results are obtained from the organic tanning bodies when using relatively large proportions of feebly acidic substances which themselves possess no appreciable degelling effect. Strong acids such as hydrochloric or sulfuric may be used in highly buffered solutions instead of the more weakly acidic acids or salts shown in the preceding examples. However, care must be exercised that the acid and the resulting salt formed in the mud through reaction with the mud bases, are highly buffered to prevent flocculation of the mud colloids. For practical use, as shown in the preceding data, best results may be expected through the use of feebly acidic substances such as sodium boroformate, acid phthalates, sodium silicofluoride, gluconic acid, acid phosphate salts, phosphoric acid, boric acid, and the like.

While in the foregoing, theories are advanced, these are put forward to facilitate the understanding of the objects and purposes of this invention; it is to be understood, however, that this invention is not dependent upon or limited to any theory put forward.

What is claimed is:

1. The process of treating an aqueous mud-laden well drilling fluid comprising, subjecting a well drilling fluid containing a gel-forming component whose pH range is from 2.4 to 8.0 to the action of an organic tanning agent.

2. The process of treating an aqueous mud-laden well drilling fluid comprising, determining the pH of a drilling fluid containing a gel-forming component, adding an acidic body with a rise of the pH above 8.0 to reduce the pH below 8.0 and in the range within which insoluble combinations between the gel-forming component and an organic tanning agent can best occur, and adding an organic tanning agent.

3. The process of treating an aqueous mud-laden well drilling fluid comprising, adding to a well-drilling fluid containing a gel-forming component, an acidic body to reduce its pH within the range of pH 2.4 to 8.0, together with an organic tanning body characterized by its ability to precipitate gelatin.

4. The process of treating an aqueous mud-laden well drilling fluid comprising, adding to a well-drilling fluid containing a gel-forming component, an acidic body in an amount sufficient to reduce the pH below 8.0 and in the range within which insoluble combinations between the gel-forming component and an organic tanning agent can best occur, together with an organic tanning agent capable of producing a tanning action on hides.

5. An aqueous mud-laden well drilling fluid containing a gel-forming component and containing from 0.02 to 2.0 per cent of an acidified organic tanning body characterized by its ability to precipitate gelatin.

6. An aqueous mud-laden well drilling fluid containing a gel-forming component and containing from 0.02 to 2.0 per cent of a weakly acidic substance capable of reducing the pH of the well drilling fluid and maintaining same within the range of pH 2.4 to 8.0, and an organic tanning body capable of producing a tanning action on hides.

7. An aqueous mud-laden well drilling fluid containing from 0.02 to 2.0 per cent of a weakly acidic buffering agent capable of reducing and maintaining the reaction below pH 8.0 and in the range within which insoluble combinations between the gel-forming component and an organic tanning agent can best occur, and an organic tanning body characterized by its ability to precipitate gelatin.

8. The process of treating an aqueous mud-laden well-drilling fluid, comprising subjecting a well drilling fluid containing a gel-forming component, to the action of an acidifying agent and an organic tanning agent, below a pH of 8.0 and in the range within which insoluble combinations between the gel-forming component and the organic tanning agent can best occur.

9. The process of treating an aqueous mud-laden well-drilling fluid, comprising subjecting a well drilling fluid containing a gel-forming component, to the action of an organic acidifying agent and an organic tanning agent, below a pH of 8.0 and in the range within which insoluble combinations between the gel-forming component and the organic tanning agent can best occur.

10. The process of treating an aqueous mud-laden well-drilling fluid, comprising subjecting a well drilling fluid containing a gel-forming component to the action of a sugar acid and a tanning body, below a pH of 8.0 and in the range within which insoluble combinations between the gel-forming component and the organic tanning agent can best occur.

TRUMAN B. WAYNE.